(12) United States Patent
Brown et al.

(10) Patent No.: US 10,794,810 B1
(45) Date of Patent: Oct. 6, 2020

(54) FLUID COMPOSITION SENSOR DEVICE AND METHOD OF USING THE SAME

(71) Applicant: Honeywell International Inc., Morris Plains, NJ (US)

(72) Inventors: Andy Walker Brown, Richardson, TX (US); Adam D. McBrady, Dallas, TX (US); Stephan Michael Bork, Murphy, TX (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/530,496

(22) Filed: Aug. 2, 2019

(51) Int. Cl.
*G01N 15/06* (2006.01)
*G01N 15/00* (2006.01)

(52) U.S. Cl.
CPC . *G01N 15/0612* (2013.01); *G01N 2015/0046* (2013.01); *G01N 2015/0053* (2013.01); *G01N 2015/0693* (2013.01)

(58) Field of Classification Search
CPC ............... G01N 15/06; G01N 15/0612; G01N 2015/0046; G01N 2015/0053; G01N 2015/0693
USPC .......................................................... 356/38
See application file for complete search history.

(56) References Cited

U.S. PATENT DOCUMENTS

| | | |
|---|---|---|
| 4,021,117 A | 5/1977 | Gohde et al. |
| 4,232,967 A | 11/1980 | Grachev et al. |
| 4,839,529 A | 6/1989 | Fruengel |
| 5,001,463 A | 3/1991 | Hamburger |
| 5,257,087 A | 10/1993 | Furuya |
| 5,426,501 A | 6/1995 | Hokanson et al. |
| 5,646,597 A | 7/1997 | Hamburger et al. |
| 5,870,190 A | 2/1999 | Unger |
| 5,932,795 A * | 8/1999 | Koutrakis ............ G01N 1/2205 422/80 |

(Continued)

FOREIGN PATENT DOCUMENTS

| | | |
|---|---|---|
| WO | 2016/073745 A2 | 5/2016 |
| WO | 2016/201113 A1 | 12/2016 |

(Continued)

OTHER PUBLICATIONS

Air Sampling Filter Cassette Housings, [online], [retrieved Feb. 11, 2020_ <URL: https://www.zefon.com.cassette-housing> (10 pages).

(Continued)

*Primary Examiner* — Roy M Punnoose
(74) *Attorney, Agent, or Firm* — Alston & Bird LLP

(57) ABSTRACT

A device and a method for detecting fluid particle characteristics. The device comprises a fluid composition sensor configured to receive a volume of fluid and a controller. The fluid composition sensor comprises a collection media configured to receive one or more particles of a plurality of particles within the fluid; and an imaging device configured to capture an image of one or more particles of the plurality of particles received by the collection media. The controller is configured to determine a particle impaction depth of each of the one or more particles of the plurality of particles within the collection media; and, based at least in part on the particle impaction depth of each of the one or more particles of the plurality of particles, determine a particulate matter mass concentration within the volume of fluid.

29 Claims, 8 Drawing Sheets

(56) References Cited

U.S. PATENT DOCUMENTS

| | | | |
|---|---|---|---|
| 6,115,119 A | | 9/2000 | Sieracki et al. |
| 6,435,043 B1* | | 8/2002 | Ferguson ............. G01N 1/2208 |
| | | | 73/863.22 |
| 6,463,814 B1* | | 10/2002 | Letarte ................. G01N 1/2208 |
| | | | 73/863.22 |
| 6,729,196 B2 | | 5/2004 | Moler et al. |
| 7,518,710 B2 | | 4/2009 | Gao et al. |
| 8,219,249 B2 | | 7/2012 | Harrod et al. |
| 8,506,686 B2 | | 8/2013 | Langle et al. |
| 8,866,063 B2 | | 10/2014 | Ozcan et al. |
| 9,007,433 B2 | | 4/2015 | Ozcan et al. |
| 9,057,702 B2 | | 6/2015 | Ozcan et al. |
| 9,057,708 B2 | | 6/2015 | Kurosawa et al. |
| 9,170,599 B2 | | 10/2015 | Ozcan et al. |
| 9,202,835 B2 | | 12/2015 | Ozcan |
| 9,715,099 B2 | | 7/2017 | Ozcan et al. |
| 9,772,281 B2 | | 9/2017 | Bertaux |
| 9,933,351 B2 | | 4/2018 | Kent et al. |
| 9,952,191 B2 | | 4/2018 | Crisp |
| 10,281,371 B2 | | 5/2019 | Hong |
| 10,317,320 B2 | | 6/2019 | David |
| 2004/0011975 A1 | | 1/2004 | Nicoli et al. |
| 2006/0234621 A1 | | 10/2006 | Desrochers et al. |
| 2008/0233636 A1 | | 9/2008 | Ryan |
| 2009/0128810 A1 | | 5/2009 | Bates |
| 2009/0219530 A1 | | 9/2009 | Mitchell et al. |
| 2013/0280752 A1 | | 10/2013 | Ozcan et al. |
| 2014/0234865 A1 | | 8/2014 | Gabriel |
| 2014/0268105 A1 | | 9/2014 | Bills et al. |
| 2015/0099272 A1 | | 4/2015 | Hwang et al. |
| 2015/0323941 A1 | | 11/2015 | Pariseau et al. |
| 2015/0355084 A1 | | 12/2015 | White |
| 2017/0370809 A1 | | 12/2017 | Miller-Lionberg et al. |
| 2018/0258469 A1 | | 9/2018 | Johnson-Buck et al. |
| 2018/0321126 A1 | | 11/2018 | Manautou et al. |
| 2019/0095586 A1 | | 3/2019 | McBrady et al. |
| 2019/0265153 A1 | | 8/2019 | Rottenberg |
| 2019/0293539 A1 | | 9/2019 | Manautou et al. |
| 2019/0294108 A1 | | 9/2019 | Ozcan et al. |
| 2019/0346356 A1 | | 11/2019 | Karnik et al. |
| 2020/0103328 A1* | | 4/2020 | Ozcan ................. G01N 15/0255 |

FOREIGN PATENT DOCUMENTS

| | | |
|---|---|---|
| WO | 2017/196885 A1 | 11/2017 |
| WO | 2017/196995 A1 | 11/2017 |
| WO | 2018/165590 A1 | 9/2018 |
| WO | 2019/097523 A1 | 5/2019 |

OTHER PUBLICATIONS

Allergenco-D & Allergenco-D Posi-Track [online], [retrieved Feb. 11, 2020_ <URL: https://www.emssales.net/media/wysiwyg/uploads/ad_peer_reviewed_study.pdf> 9 pages.

Default Unpublished U.S. Appl. No. 16/396,524, filed Apr. 26, 2019, entitled "Flow Device and Associated Method and System".

HPM Series Particulate Matter Sensors, [article,online], 2019, [retrieved Jul. 25, 2019] <URL: https://sensing.honeywell.com/sensors/particulate-sensors/hpm-series, 11 pages.

Wu et al. Label-Free Bioaerosol Sensing Using Mobile Microscopy and Deep Learning, , [article, online], 2018, [retrieved Nov. 8, 2018], URL: https://pubs.acs.org/doi/10.1021/acsphotonics.8b01109, 11 pages.

Wu et al., Label-Free Bioaerosol Sensing Using Mobile Microscopy and Deep Learning, [article, online], 2018, [retrieved Jul. 25, 2019], <URL: https://www.semanticscholar.org/paper/Label-Free-Bioaerosol-Sensing-Using-Mobile-and-Deep-Wu-Calis/fff5dc6d661ab985c3d14ec04fb84907d7750ab7>, 16 pages.

Schneider et al., Fast Particle Characterization Using Digital Holography and Neural Networks, 2016, [online article] [retrieved on Mar. 25, 2020] retrieved from the Internet URL: https://www.ncbi.nlm.nih.gov/pubmed/26835632, 7 pages.

Unpublished U.S. Appl. No. 62/837,066, filed Apr. 22, 2019, entitled "System and Method for Deep Learning-Based Color Holographic Microscopy".

Unpublished U.S. Appl. No. 62/838,149, filed Apr. 24, 2019, entitled "Label-Free Bio-Aerosol Sensing Using Mobile Microscopy and Deep Learning".

Unpublished U.S. Appl. No. 16/396,524, filed Apr. 26, 2019, entitled "Flow Device and Associated Method and System".

Office Action for U.S. Appl. No. 161396,524 dated Jun. 1, 2020, 13 pages.

\* cited by examiner

FLUID COMPOSITION SENSOR DEVICE AND METHOD OF USING THE SAME

BACKGROUND

Sensor and devices may be utilized to characterize various aspects of fluids in a wide variety of applications. As just one example, sensor devices may be utilized for monitoring air conditions, such as monitoring and characterizing the particulate content of a flow of air. However, existing fluid sensor devices provide limited functionality in generating data indicative of certain characteristics of fluids, such as the particulate matter mass concentration of particles contained within a fluid flow.

Accordingly, a need exists for an improved fluid sensor device characterized by high-accuracy particulate matter mass concentration estimations and increased particulate matter characterization functionality.

BRIEF SUMMARY

Various embodiments are directed to a device for detecting fluid particle characteristics comprising: a fluid composition sensor configured to receive a volume of fluid, the fluid composition sensor comprising: a collection media configured to receive one or more particles of a plurality of particles; an imaging device configured to capture an image of one or more particles of the plurality of particles received by the collection media; and a controller configured to: determine a particle impaction depth of at least one of the one or more particles of the plurality of particles within the collection media; and based at least in part on the particle impaction depth of each of the one or more particles of the plurality of particles, determine a particulate matter mass concentration within the volume of fluid. In various embodiments, the image captured by the fluid composition sensor may comprise two or more particle images of the one or more particles of the plurality of particles received by the collection media. In various embodiments, a particle image may comprise a holographic image reconstruction of a particle. In various embodiments, the imaging device may be configured to capture the image of one or more particles of the plurality of particles received by the collection media using lensless holography. In various embodiments, the image of the one or more particles of the plurality of particles received by the collection media is captured using optical microscopy. In various embodiments, the controller may be configured to determine a particle impaction depth of each of the one or more particles of the plurality of particles within the collection media using one or more computational image focusing techniques. In various embodiments, the one or more computational image focusing techniques may comprise Angular Spectrum Propagation. In various embodiments, the particle impaction depth of each of the one or more particles of the plurality of particles within the collection media may be determined using one or more mechanical image focusing techniques. In various embodiments, the controller may determine the particle impaction depth of a particle received by the collection media based at least in part on a depth of focus determined using one or more image focusing techniques, a distance between the imaging device and the transparent substrate, and a collection media thickness, wherein the depth of focus is the distance between the imaging device and the particle. In various embodiments, the controller may be further configured to determine the approximate collective mass of the plurality of particles present within the volume of fluid based at least in part on the mass of each of the one or more particles received by the collection media. In various embodiments, the controller may be further configured to determine the mass of each of the one or more particles received by the collection media based at least in part on an initial momentum of each of the one or more particles, a collection media type, and the particle impaction depth of each of the one or more particles. In various embodiments, the controller may be further configured to determine the initial momentum of each of the one or more particles received by the collection media based at least in part on the particle impaction depth and a particle initial velocity of each of the one or more particles. In various embodiments, the controller may be further configured to apply a compensation factor to the approximate collective mass of the plurality of particles present within the volume of fluid based at least in part on one or more of a particle cross-sectional area, an ambient temperature, and an ambient humidity. In various embodiments, the controller may be further configured to determine a particle type of each of the one or more particles received by the collection media using one or more machine learning techniques. In various embodiments, the controller may be further configured to determine a particle density of each of the one or more particles received by the collection media based at least in part on the particle impaction depth of each of the one or more particles. In various embodiments, the collection media may be embodied as a portion of a removable collection media slide configured for movement relative to the fluid composition sensor.

Various embodiments are directed to a method for detecting fluid particle characteristics comprising: receiving, via a collection media, one or more particles of a plurality of particles; capturing an image of the one or more particles of the plurality of particles received by the collection media; determining a particle impaction depth of each of the one or more particles of the plurality of particles within the collection media; and based at least in part on the particle impaction depth of each of the one or more particles of the plurality of particles, determine an approximate collective mass of the plurality of particles present within a volume of fluid. In various embodiments, the image of the one or more particles of the plurality of particles received by the collection media may captured using lensless holography. In various embodiments, the image of the one or more particles of the plurality of particles received by the collection media is captured using optical microscopy. In various embodiments, the particle impaction depth of each of the one or more particles of the plurality of particles within the collection media may be determined using one or more computational image focusing techniques. In various embodiments, the one or more computational image focusing techniques may comprise Angular Spectrum Propagation. In various embodiments, the particle impaction depth of each of the one or more particles of the plurality of particles within the collection media may be determined using one or more mechanical image focusing techniques. In various embodiments, the particle impaction depth of each of the one or more particles of the plurality of particles within the collection media may be determined based at least in part on a depth of focus, a distance between the imaging device and the transparent substrate, a thickness of the transparent substrate, and a collection media thickness, wherein the depth of focus is the distance between the imaging device and the particle. In various embodiments, the method may further comprise determining the particle size each of the one or more particles of the plurality of particles received by the collection media. In various embodiments, the mass of each of the one or more particles received by the collection media may be determined based at least in part on an initial momentum of each of the one or more particles, a collection media type, and the particle impaction depth of each of the one or more particles. In various embodiments, the initial momentum of each of the one or more particles received by the collection media may be determined based at least in part on the particle impaction depth and a particle initial velocity of each of the one or more particles. In various embodiments, the method may further comprise applying a compensation factor to the approximate collective mass of the plurality of particles present within a volume of fluid based at least in part on one or more of a particle cross-sectional area, an ambient temperature, and an ambient humidity. In various embodiments, the method may further comprise determining a particle type of each of the one or more particles received by the collection media using one or more machine learning techniques.

BRIEF DESCRIPTION OF THE DRAWINGS

Reference will now be made to the accompanying drawings, which are not necessarily drawn to scale, and wherein.

DETAILED DESCRIPTION

Figure 1:
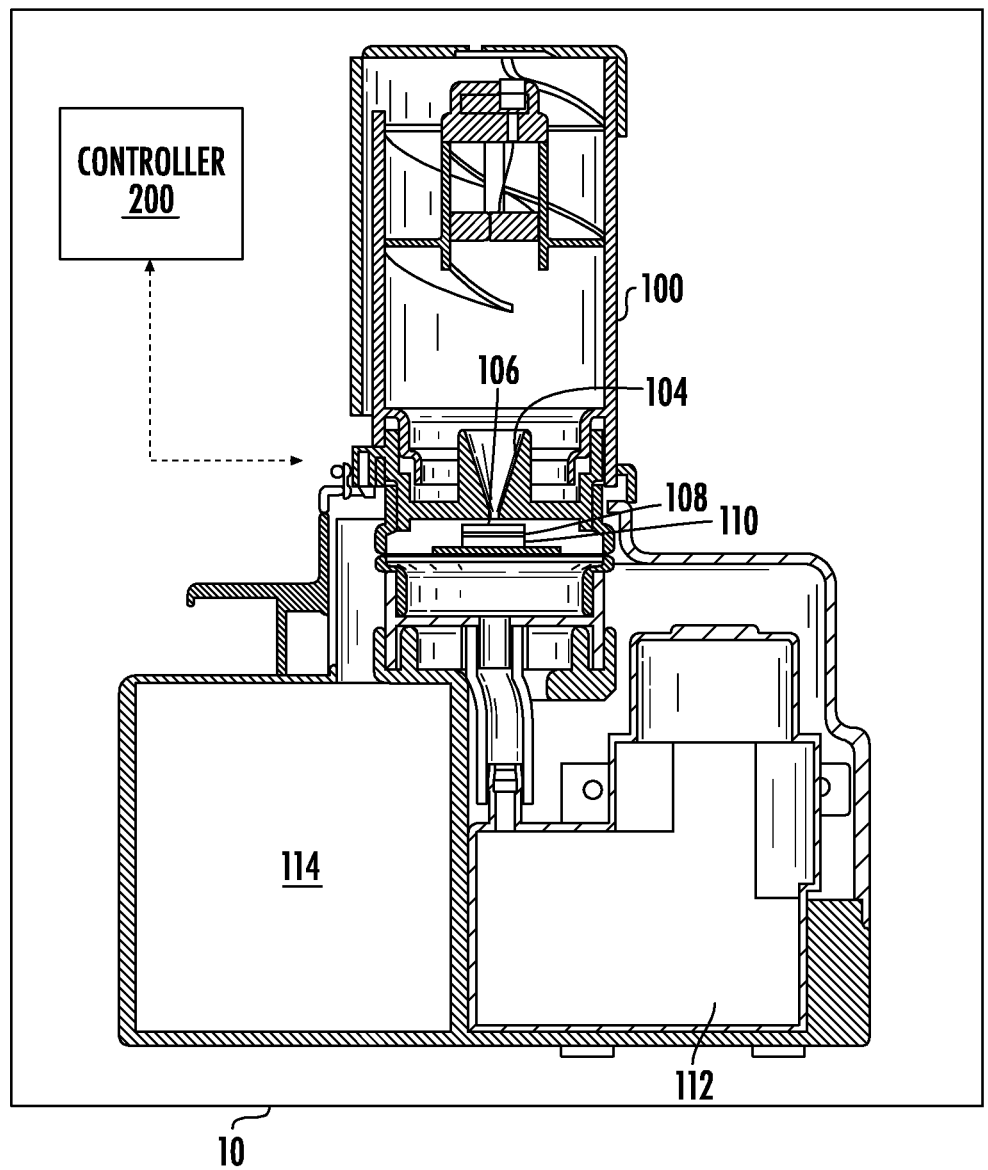
FIG. 1 schematically illustrates an exemplary apparatus in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. As used herein, a "fluid" may be embodied as a gas, a liquid, or a combination of a gas and a liquid in a single flow. Thus, the term "fluid" encompasses various materials subject to flow, such as, but not limited to, liquids and/or gases (e.g., air, oil, or the like). Thus, various embodiments are directed to fluid sensing systems, such as gas sensing systems (e.g., certain embodiments being specifically configured for operation with air; other embodiments being configured for operation with other gases, such as inert gases, volatile gases, and/or the like), liquid sensing systems, and/or the like.

Overview

Described herein is a device configured to characterize and monitor particulate matter within a volume of fluid. The device discussed herein may be configured to estimate the particulate matter mass concentration within a volume of fluid based at least in part on the respective impaction depths of particles received by a collection media of a fluid composition sensor and a known fluid flow rate of the volume of fluid flowing toward a receiving surface of the collection media. Because particle impaction depth as described herein has a direct correlation to particle mass—among other variables, such as, for example, particle linear velocity and particle shape—the present invention is capable of accurately estimating the mass of a particle impacted into the collection media using an imaging device configured to capture an image of the particles received by a collection media. Accordingly, such configurations are able to reduce the amount of approximation associated with determining the mass of a particle, thereby increasing the accuracy of the device with respect to the measured particulate matter mass concentration present within a volume of fluid. Further, the device discussed herein may be configured to characterize the particle composition within the volume of fluid by directly identifying the particle size and particle type of each of the particles received by the collection media of the fluid composition sensor. By directly determining the particle size, particle type, and particle impaction depth, the device as described herein may be configured to detect a change in particle composition within a volume of fluid over time.

Fluid Composition Sensor

The device 10 may comprise a fluid composition sensor 100 configured to receive a volume of fluid flowing therethrough. Specifically, the device 10 may be configured to receive a volume of a gas, such as air, flowing therethrough. In various embodiments, the fluid composition sensor 100 may be further configured to capture an image of one or more particles of a plurality of particles present within the received volume of fluid. As illustrated in FIG. 1, the fluid composition sensor 100 may comprise a housing 101, an injection nozzle 104, a collection media 106, an at least partially transparent substrate 108, and an imaging device 110. In some embodiments, the fluid composition sensor 100 may further comprise a power supply 114 configured to power the fluid composition sensor 100 and a fan or pump 112 configured to pull the volume of fluid into and through the fluid composition sensor 100. In various embodiments, the fan or pump 112 is calibrated, such that the flow rate of fluid moving through the device is known/determined based at least in part on the operating characteristics (e.g., operating power) of the fan or pump 112. In various embodiments, the fluid composition sensor 100 may comprise a lens free microscope, such as one described in WIPO Publication Number 2018/165590, which is incorporated herein by reference in its entirety. In various embodiments, a lens-free microscope may utilize one or more techniques, such as, for example, lensless holography, to capture a particle image, as described herein, of the one or more particles of a plurality of particles received by a collection media 106. Alternatively, the fluid composition sensor 100 may comprise a lens-based imaging device or any other apparatus configured to capture an image which may be analyzed by an apparatus as described herein so as to determine a particle size and a particle impaction depth 121 of one or more particles captured by the collection media 106. In various embodiments, a lens-based imaging device may utilize one or more imaging techniques, such as, for example, optical microscopy, to capture a particle image, as described herein, of the one or more particles of a plurality of particles 120 received by a collection media 106. In various embodiments, optical microscopy may comprise passing a visible light transmitted through or reflected from a collection media 106 and/or a plurality of particles 120 disposed therein through one or more lenses to magnify and capture an image of one or more of the particles of the plurality of particles 120 within the collection media 106. As described herein, the fluid composition sensor 100 may be electronically and communicatively connected to a controller 200.

Figure 2:
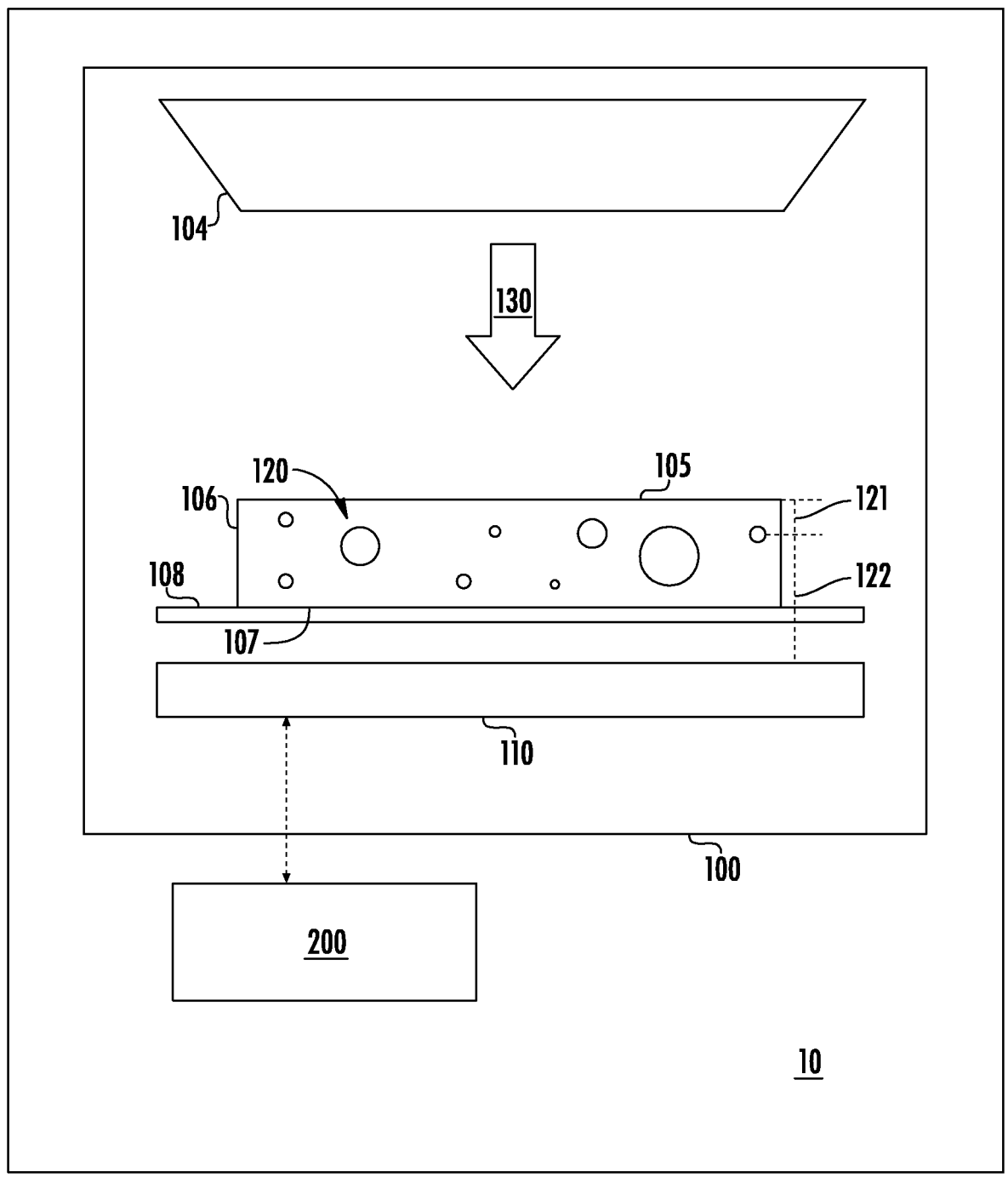
FIG. 2 illustrates a cross-sectional view of an exemplary apparatus as described herein.
Figure 5:
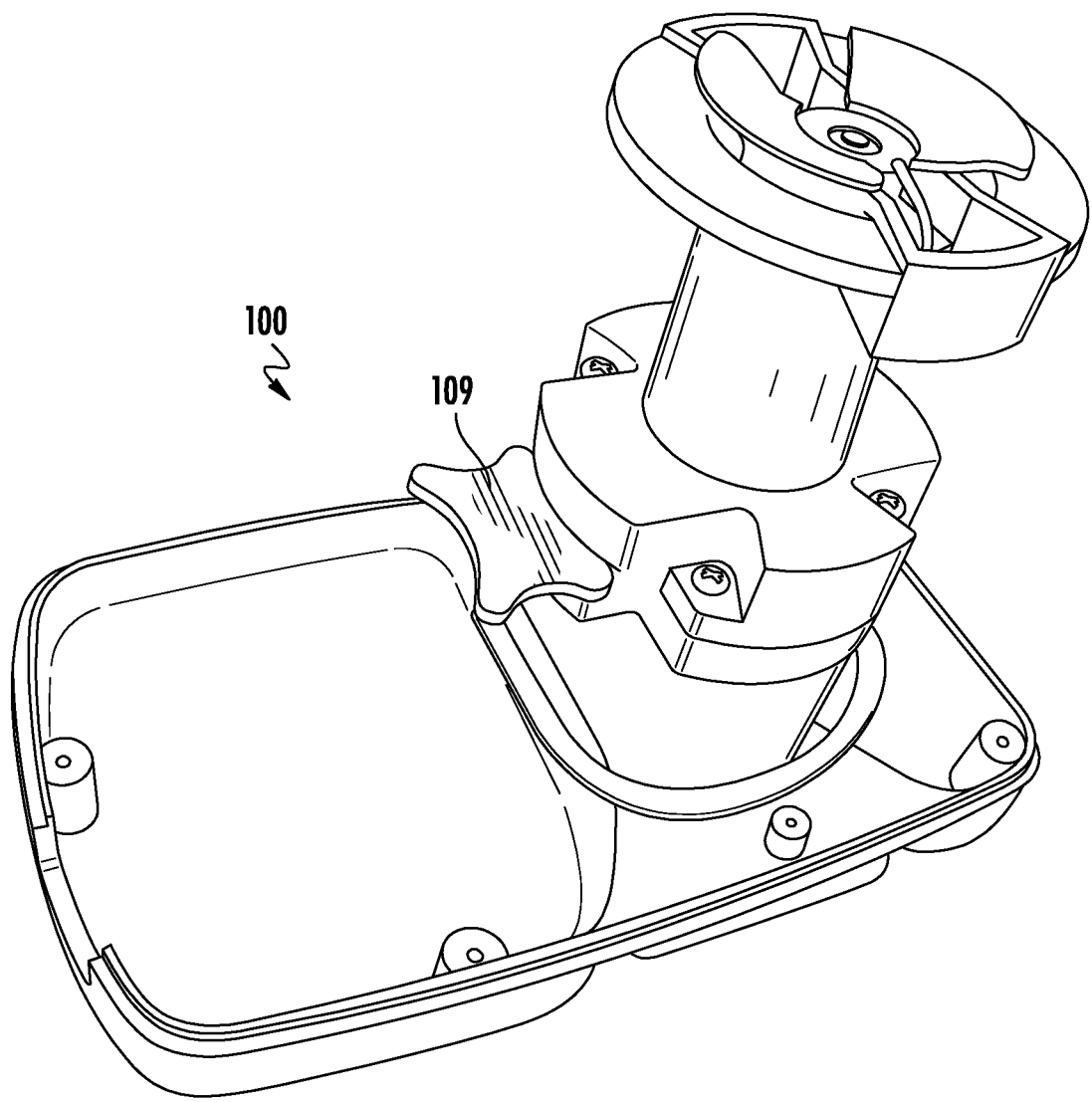
FIG. 5 illustrates an exemplary apparatus in accordance with various embodiments as described herein.

In various embodiments, as illustrated in FIGS. 1 and 2, the injection nozzle 104 may be configured to direct the flow of the volume of fluid received by the fluid composition sensor 100 in a flow direction 130 at least substantially perpendicular to and directed toward a receiving surface of a collection media 106. In various embodiments, the collection media 106 may be embodied as a portion of a collection media assembly. For example, the collection media assembly may be embodied as a replaceable slide (as illustrated in FIGS. 5-8b), within which a replaceable collection media 106 may be disposed. In other embodiments, the entirety of the replaceable slide may be disposable, and the collection media 106 may be permanently secured therein. However, in other embodiments, the collection media assembly may comprise a collection media tape 106 (e.g., the collection media tape may be embodied as an elongated collection media 106 that may be moved through the fluid composition sensor 100 such that a fresh (e.g., unused) portion of the collection media tape may be exposed to the fluid flowing through the injection nozzle 104). As yet another example, the collection media 106 may be disposed on and/or as a portion of a rotatable disc, such that the collection media 106 may be rotated relative to the fluid composition sensor 100 such that a fresh (e.g., unused) portion of the collection media disc may be exposed to the fluid flowing through the injection nozzle 104. It should be understood that the collection media 106 may be embodied in any of a variety of forms. In yet other embodiments, the collection media 106 may be permanently affixed within the composition sensor 100, such that the entire composition sensor 100 may be disposable once the collection media 106 is sufficiently filled with particles from a fluid flowing through the composition sensor 100. The collection media 106 may be configured to receive one or more particles of a plurality of particles 120 via interaction with the volume of fluid. In various embodiments, the collection media 106 may comprise a receiving surface 105, a backside 107, and a thickness defined by the distance between the receiving surface 105 and the backside 107. In various embodiments, the thickness of the collection media 106 may be at least substantially between about 10 and about 1000 microns, (e.g., 100 microns). In various embodiments, the collection media 106 may comprise a material suitable to stop one or more particles of a plurality of particles 120 traveling at a velocity into the receiving surface 105 before the particle reaches the backside 107, such that the one or more particles of the plurality of particles 120 are disposed within the collection media at a distance along the thickness of the collection media 106. For example, in various embodiments, the collection media may comprise an adhesive (i.e. sticky) material, such as a gel. In various embodiments, the fluid composition sensor 100 may comprise a transparent substrate 108 positioned at least substantially adjacent (e.g., secured directly to) the backside 107 of the collection media 106. In various embodiments, the collection media assembly may further comprise the transparent substrate 108. Further, in various embodiments, such as those in which the collection media assembly is embodied as a slide, the collection media assembly may comprise a collection media housing 113, which may define a handle 109. In various embodiments, a collection media housing 113 may be configured to receive and secure at least a portion of a collection media 106 and/or a substrate 108. In various embodiments, collection media housing 113 may be configured to be removably positioned at least partially within a fluid composition sensor 100, such the collection media 106 is disposed within a fluid flow path of a volume of fluid traveling in flow direction 130. In various embodiments, the collection media housing 113 may be configured to have at least one opening positioned adjacent at least a portion of the collection media 106 such that the one or more particles of a plurality of particles present within a volume of fluid may engage a receiving surface 105 of the collection media 106. In various embodiments, the collection media housing 113 may define a handle 109. In various embodiments, as shown in FIG. 5, the handle 109 may be configured to facilitate the accessibility of the collection media 106 and/or housing 113, for example, to enable the removal and/or replacement of the collection media 106 from the fluid composition sensor 100. As noted above, the collection media 106 may be configured for use in conjunction with (or embodied as), for example, a slide, a tape, a disc, or any other appropriate mechanism configured to facilitate the transportation of the collection media 106.

In various embodiments, a device 10 may experience increased inaccuracies over time, for example, as the number of particles collected within the collection media 106 increases (and the resulting physical properties of the collection media 106 changes as a result of the increase number of particles disposed therein. Thus, one or more components of the collection media assembly as described herein may be replaceable. In various embodiments, replacing one or more components of the collection media assembly may comprise removing one or more components from the fluid composition sensor 100 and replacing the one or more components of the collection media assembly with one or more at least substantially similar components. Alternatively, it should be understood that in various embodiments, replacing one or more components of the collection media assembly may comprise cleaning, repositioning, and/or modifying the one or more components of the collection media assembly so as to decrease the number of particles present within a portion of the collection media 106 exposed to the air flow within the composition sensor 100. As a non-limiting example, in various embodiments wherein the collection media assembly may comprise an adhesive tape, at least a portion of the tape may be removed so as to expose a fresh portion of tape positioned thereunder and corresponding to the at least a portion of the tape that was removed. As a further non-limiting example, in various embodiments wherein the collection media assembly may comprise a disc, the disc may be configured to be cleaned such that the characteristics of the disc may be at least substantially similar to those of a new disc. In various embodiments, the fluid composition sensor 100 may in part or in whole be configured to be replaceable and/or disposable.

In various embodiments, the fluid composition sensor 100 may comprise an imaging device 110 configured to capture an image of the one or more particles of the plurality of particles 120 received by the collection media 106. In various embodiments, the imaging device 110 may be positioned at least substantially adjacent (e.g., in contact with or spaced a distance away from) the backside 107 of the transparent substrate 108 such that the imaging device 110 may effectively capture one or more images of the one or particles captured within the collection media 106. In various embodiments, the fluid composition sensor 100 may have a designated field of view for capturing, permanently and/or temporarily, an image of multiple particles of the plurality of particles simultaneously. The collection media 106 may reside at least partially within the field of view of the imaging device 110, such that the plurality of particles 120 captured by the collection media 106 are visible by the imaging device 110. As shown in FIG. 2, the imaging device 110 may be positioned beneath the transparent substrate 108 relative to the collection media 106. For example, the imaging device 110 may be positioned between about 100 microns and about 5 mm (e.g., 1 mm) way from the transparent substrate 108. Alternatively, the imaging device 110 may be positioned above the transparent substrate 108 relative to the collection media 106.

In various embodiments, the imaging device 110 may be configured to capture the image of one or more particles of the plurality of particles 120 received by the collection media 106 using one or more imaging techniques such as, for example, lensless holography. In various embodiments wherein the imaging device is configured to utilize lensless holography, the imaging device may computationally produce an image of the one or more particles received by the collection media 106 by digitally reconstructing one or more microscopic images of one or more particles received by the collection media 106 without using a lens. Alternatively, and/or additionally, the imaging device 110 may utilize optical microscopy to capture an image of one or more particles of the plurality of particles 120 received by the collection media 106. In some embodiments, the fluid composition sensor 100 may be configured to capture one or more images of a plurality of particles in the collection media 106 simultaneously. For example, the fluid composition sensor 100 may have a designated field of view for capturing, permanently and/or temporarily, an image of multiple particles of the plurality of particles simultaneously, as described herein. In various embodiments, the one or more images captured by the fluid composition sensor 100 may be transmitted at least to the controller 200. In various embodiments, the imaging device 110 may be configured to capture one or more images at a first time and a second time, wherein the first time represents the start of an analysis of the one or more particles of the plurality of particles 120 captured by the collection media 106 by the device 10 and the second time is subsequent the first time. In such a configuration, the device may be able to distinguish between particles present within the collection media 106 at the start of the particle analysis and particles that were newly received by the collection media 106 by comparing the respective particle images captured at the first and second times and identifying any particles from the second captured particle image that were not captured in the first captured particle image.

In various embodiments, the fluid composition sensor 100 may be connected to a power supply 114 configured to receive power and power the fluid composition sensor 100. As non-limiting examples, the power supply 114 may comprise one or more batteries, one or more capacitors, one or more constant power supplies (e.g., a wall-outlet), and/or the like. In some embodiments the power supply 114 may comprise an external power supply positioned outside of the fluid composition sensor 100 and configured to deliver alternating or direct current power to the fluid composition sensor 100. Further, in some embodiments, as illustrated in FIG. 1, the power supply 114 may comprise an internal power supply, for example, one or more batteries, positioned within the fluid composition sensor 100. In various embodiments, a power supply 114 may be connected to the controller 200 to enable distribution of power through the controller to the fluid composition sensor 100.

Figure 6:
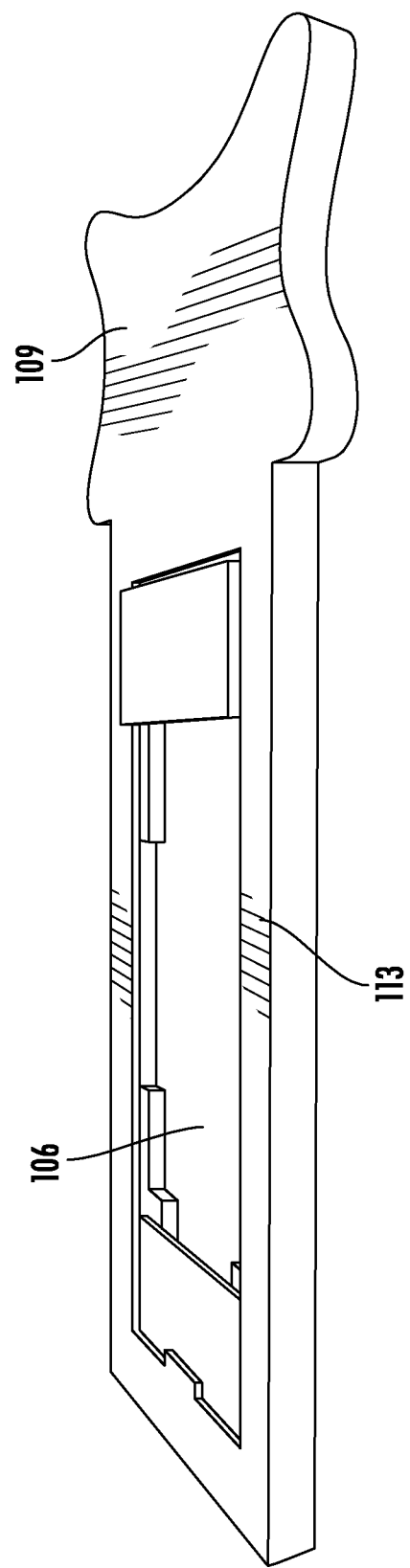
FIG. 6 illustrates a collection media assembly in accordance with one embodiment as described herein.

FIGS. 6-8b show various exemplary embodiments of a collection media assembly as described herein. As shown in FIGS. 6-8b, the collection media assembly may comprise a collection media 106 disposed upon a replaceable slide, a collection media housing 113 configured to secure the replaceable slide—and thus the collection media 106—therein, and a handle 109. In various embodiments, the collection media 106 may be configured to be attached to a transparent substrate 108, which may further be disposed within the collection media housing 113. In various embodiments, the replaceable slide may define the transparent substrate 108. As shown in FIG. 6, the collection media housing 113 may comprise a tab proximate at least a portion of an opening configured to receive the replaceable slide via a hinged connection that enables the replaceable slide to snap into a desired position. The collection media 106 may be configured to be replaceable, as it may be removed from the collection media housing 113 via the unhinging of the replaceable slide from its secured position within the collection media housing 113 and subsequently replaced with a different collection media 106 (e.g., a fresh collection media 106). In various embodiments, the collection media housing 113 may be removed from the fluid composition sensor 100, for example, via user interaction with the handle 109.

Figure 7A:
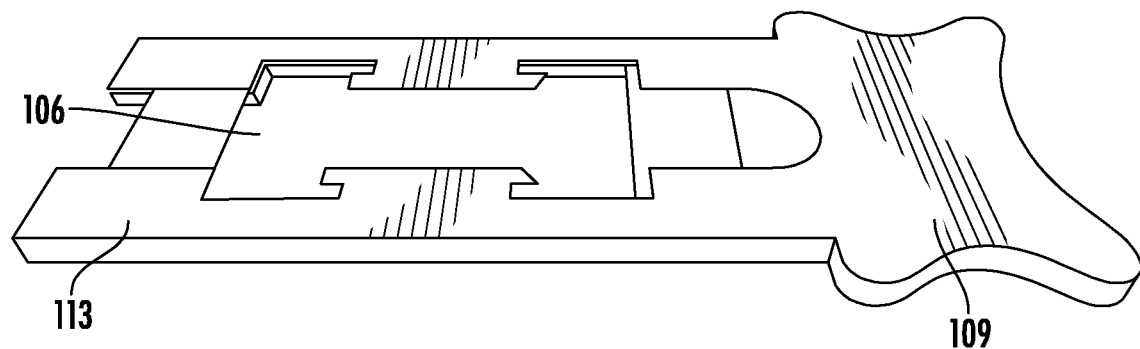
FIGS. 7a-7b illustrate various views of a collection media assembly in accordance with one embodiment as described herein.
Figure 7B:
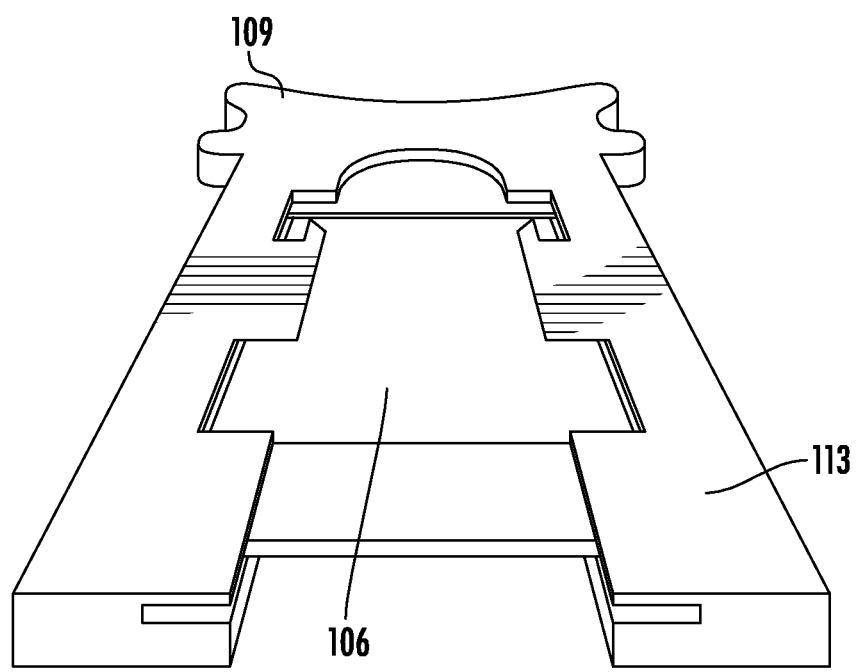

As shown in FIGS. 7a and 7b, the collection media housing 113 may comprise a slot along at least one side with dimensions corresponding to a cross-section of a replaceable slide such that the housing 113 may be configured to receive the replaceable slide with the collection media 106 disposed thereon via the slot. The collection media 106 may be configured to be replaceable, as it may be removed from the collection media housing 113 via the sliding of the replaceable slide from its secured position within the collection media housing 113 through the slot and subsequently replaced with a different collection media 106. The collection media housing 113 may be removed from the fluid composition sensor 100, for example, via user interaction with the handle 109.

Figure 8A:
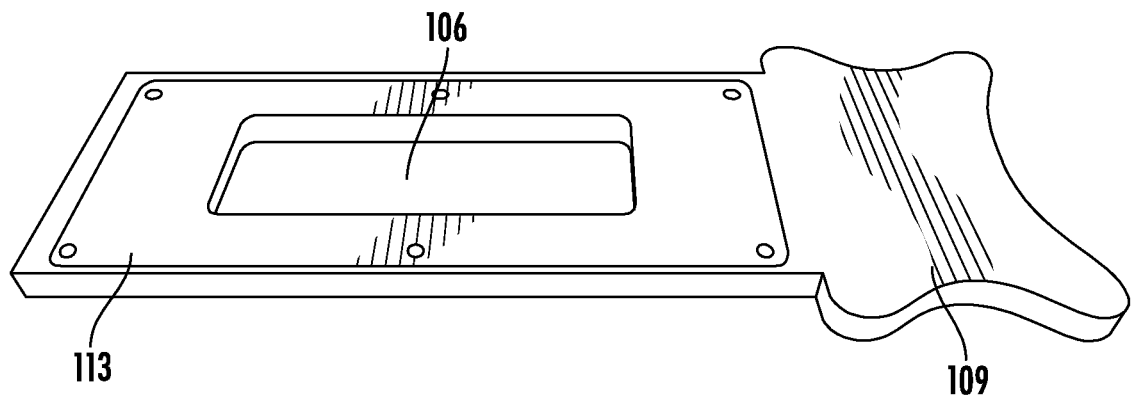
FIGS. 8a-8b illustrate various views of a collection media assembly in accordance with one embodiment as described herein.
Figure 8B:
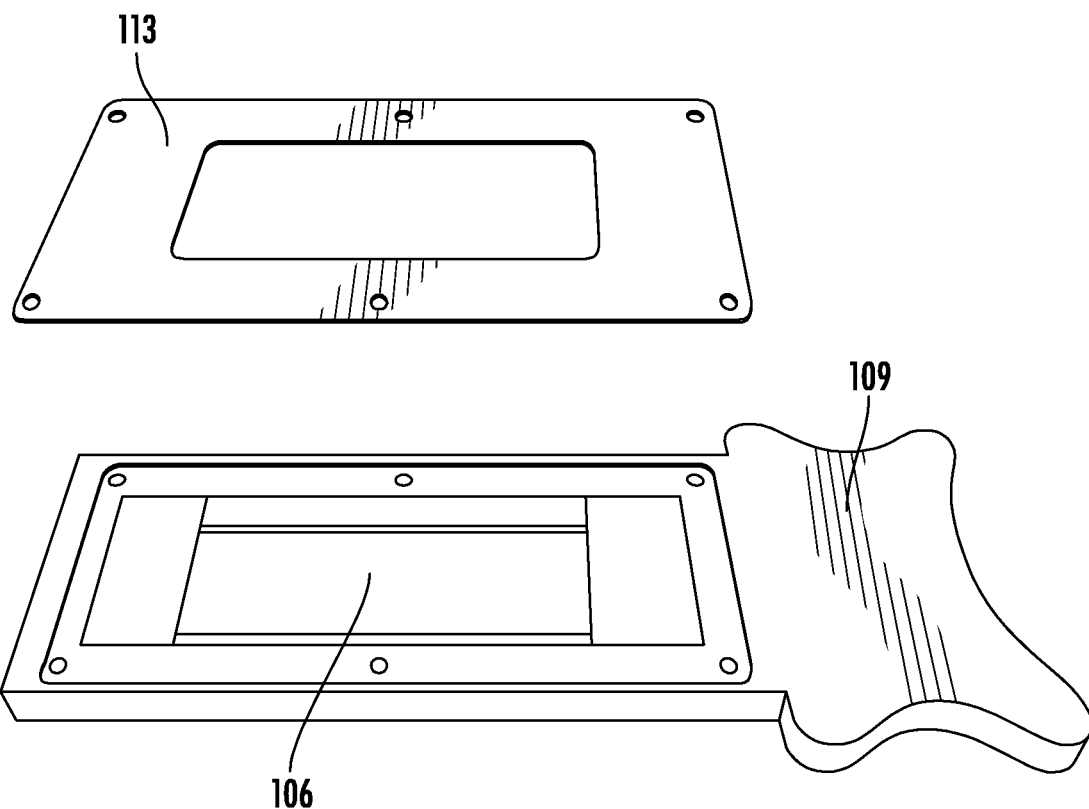

As shown in FIGS. 8a and 8b, the collection media housing 113 may comprise a removeable face such that the housing 113 may be configured to receive the replaceable slide when the removable face is in a detached configuration and secure the replaceable slide into a desired position when the removable face is in an assembled configuration. The collection media 106 may be configured to be replaceable, as it may be removed from the collection media housing 113 via the detachment of the removable face of the collection media housing 113 and the recovery of the replaceable slide from its secured position within the collection media housing 113 and subsequently replaced with a different collection media 106. The collection media housing 113 may be removed from the fluid composition sensor 100, for example, via user interaction with the handle 109.

Particle Impaction Depth

As discussed herein, each of the one or more particles of the plurality of particles 120 may comprise one or more particles characteristics, such as, for example, particle size, particle mass, particle density, particle velocity (e.g., particle linear velocity), particle cross-sectional area, and particle shape. In various embodiments, a particle size of a particle may be approximated based on a particle diameter. In various embodiments, the particle velocity of a particle may be approximated based at least in part on a known flow rate of fluid moving through the device 10. In various embodiments, a particle travelling at a particle velocity in an air flow direction 130 towards the collection media 106 may further comprise a particle momentum, which may be affected at least in part by the one or more particle characteristics. When a particle is at a receiving surface 105 of the collection media 106, the particle may define an initial momentum. The depth at which the particle is subsequently embedded into the collection media (i.e. a particle impaction depth 121) is directly related at least in part to the initial momentum of the particle. In various embodiments, the particle impaction depth 121 may be related to the particle size, the particle mass, and the particle velocity.

As illustrated in FIG. 2, each particle of the plurality of particles 120 within the collection media 106 may further define both an impaction depth 121 and a depth of focus 122. In various embodiments, an impaction depth 121 of a particle may comprise the distance between a receiving surface 105 of the collection media 106 and the location at which the particle is stopped within the collection media 106. As described herein, the particle may travel in an air flow direction 130 through the receiving surface 105 at a velocity and become disposed within the collection media 106 before reaching the backside 107. The depth at which the particle is embedded into the collection media 106 may define the impaction depth 121 of the particle. The impaction depth 121 of a particle may be correlated to at least an initial momentum of the particle at the receiving surface 105 of the collection media that must be dissipated by the collection media 106. In various embodiments, the impaction depth 121 of a particle may be affected by a collection media type, a particle shape (e.g., a particle cross-sectional area, a particle orientation), an ambient temperature, and/or an ambient humidity. In various embodiments, for example, a compensation factor may be applied to the estimated mass of a particle to account for the particle cross-sectional area because a larger particle cross-sectional area will disperse kinetic energy more quickly within the collection media, thereby decreasing the particle impaction depth. In various embodiments, a compensation factor may be applied to the estimated mass of a particle to account for the ambient temperature and/or ambient humidity because both the ambient temperature and ambient humidity affect the viscosity of the collection media, and therefore, may either increase or decrease the resistance force experienced by a particle from a collection media, thereby affecting the particle impaction depth. In various embodiments, the ambient temperature and humidity may be measured by either the device or one or more remote sensors configured to transmit temperature and humidity data to the device.

In various embodiments, the impaction depth 121 of one or more particles of the plurality of particles 120 may be determined by the controller 200 based at least in part on a depth of focus 122. In various embodiments, the impaction depth 121 of a particle within the collection media 106 may be calculated by subtracting the measured depth of focus 122 of a particle from the sum of the collection media thickness, the transparent substrate thickness, and the distance between the transparent substrate 108 and the imaging device 110. In various embodiments, the depth of focus 122 of a particle may comprise the distance between an imaging device 110 and the location at which the particle is stopped within the collection media 106. In various embodiments, as shown in FIG. 2, the depth of focus 122 of a particle within the collection media 106 may comprise the sum of the distance between the location at which the particle is stopped within the collection media 106 and a backside 107 of the collection media 106, the thickness of the transparent substrate 108, and the distance between the transparent substrate 108 and the imaging device 110. In various embodiments, the depth of focus 122 of one or more particles of the plurality of particles 120 may be determined by the controller 200 using one or more image focusing techniques, such as, a computational technique (e.g., Angular Spectrum Propagation (ASP)) or a mechanical technique (e.g., opto-mechanical adjustment). In various embodiments, opto-mechanical adjustment may comprise the mechanical adjustment of one or more components of a lens-based imaging device 110 so as to optimize a particle image. In various embodiments, may further comprise collecting data corresponding to the adjustment of the one or more components of the imaging device in order to determine a depth of focus.

Controller

Figure 3:
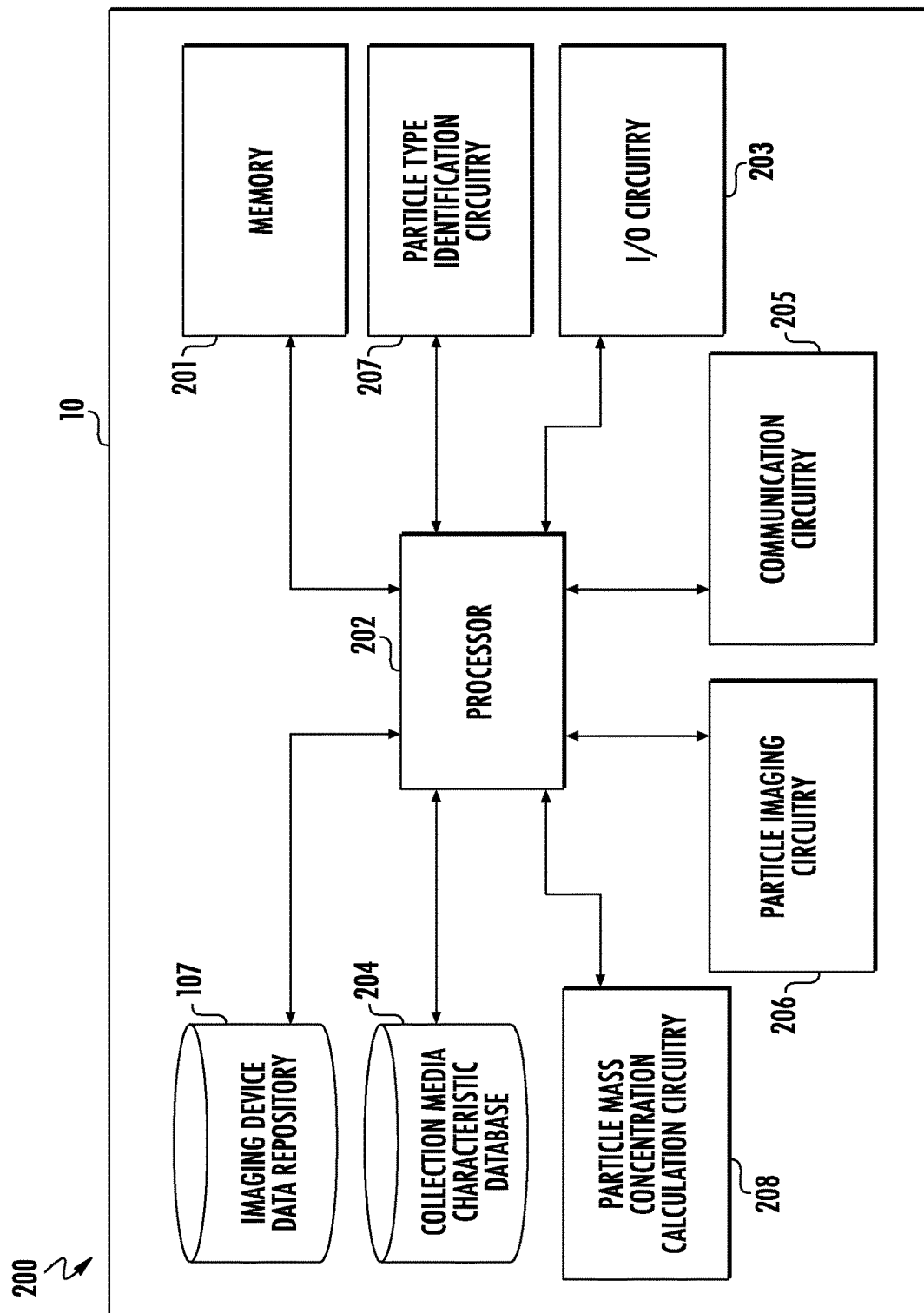
FIG. 3 schematically illustrates an exemplary apparatus for implementing various embodiments of the present disclosure.

As shown in FIGS. 1-3, the device 10 may comprise a controller 200 configured to determine a particle impaction depth 121 of each of the one or more particles of the plurality of particles 120 within the collection media 106, and based at least in part on the particle impaction depth 121 of each of the one or more particles of the plurality of particles 120, determine an approximate collective mass of the plurality of particles present within the volume of fluid. As illustrated in FIG. 3, the controller 200 may comprise a memory 201, a processor 202, input/output circuitry 203, communication circuitry 205, an imaging device data repository 107, a collection media characteristic database 204, particle imaging circuitry 206, particle type identification circuitry 207, and particle mass concentration calculation circuitry 208. The controller 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the controller 200 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. For example, the memory 201 may be an electronic storage device (e.g., a computer readable storage medium). In various embodiments, the memory 201 may be configured to store information, data, content, applications, instructions, or the like, for enabling the apparatus to carry out various functions in accordance with example embodiments of the present disclosure. It will be understood that the memory 201 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 201 may be configured to store particle size data, particle type data, particle impaction depth data, particle image data, particle shape data, particle cross-sectional area data, particle mass data, particle density data, and particulate matter mass concentration data associated with a volume of fluid. In various embodiments, the memory may be further configured to store one or more particle impaction depth-momentum look-up tables.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 200 may include input-output circuitry 203 that may, in turn, be in communication with the processor 202 to provide output to the user and, in some embodiments, to receive input such as a command provided by the user. The input-output circuitry 203 may comprise a user interface, such as a graphical user interface (GUI), and may include a display that may include a web user interface, a GUI application, a mobile application, a client device, or any other suitable hardware or software. In some embodiments, the input-output circuitry 203 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 202, input-output circuitry 203 (which may utilize the processing circuitry), or both may be configured to control one or more functions of one or more user interface elements through computer-executable program code instructions (e.g., software, firmware) stored in a non-transitory computer-readable storage medium (e.g., memory 201). Input-output circuitry 203 is optional and, in some embodiments, the controller 200 may not include input-output circuitry. For example, where the controller 200 does not interact directly with the user, the controller 200 may generate user interface data for display by one or more other devices with which one or more users directly interact and transmit the generated user interface data to one or more of those devices. For example, the controller 200, using user interface circuitry may generate user interface data for display by one or more display devices and transmit the generated user interface data to those display devices.

The communications circuitry 205 may be a device or circuitry embodied in either hardware or a combination of hardware and software that is configured to receive and/or transmit data from/to a network and/or any other device, circuitry, or module in communication with the apparatus 200. For example, the communications circuitry 205 may be configured to communicate with one or more computing devices via wired (e.g., USB) or wireless (e.g., Bluetooth, Wi-Fi, cellular, and/or the like) communication protocols.

In various embodiments, the processor 202 may be configured to communicate with the particle imaging circuitry 206. The particle imaging circuitry 206 may be a device or circuitry embodied in either hardware or a combination of hardware and software that is configured to receive, process, generate, and/or transmit data, such as an image captured by the imaging device 110. In various embodiments, the particle imaging circuitry 206 may be configured to analyze one or more images captured by the imaging device 110 of the fluid composition sensor 100 to determine which particles of the plurality of particles 120 present within the collection media 106 were newly received by the collection media 106 during a recent particle analysis. The particle imaging circuitry 206 may receive from the imaging device a first captured particle image and a second captured particle image, captured at a first time and a second time, respectively, wherein the first time represents the start of an analysis of the one or more particles of the plurality of particles 120 captured by the collection media 106 by the device 10 and the second time is subsequent the first time (occurs after the first time). In such a configuration, the device may be configured to distinguish between particles present within the collection media 106 at the start of the particle analysis and particles that were newly received by the collection media 106 by comparing the respective particle images captured at the first and second times and identifying any particles from the second captured particle image that were not captured in the first captured particle image. In various embodiments, the particle imaging circuitry 206 may be further configured to analyze one or more images captured by the imaging device 110 of the fluid composition sensor 100 to determine the size of each of the one or more particles of the plurality of particles 120 within the collection media 106. In various embodiments, the size of a particle may be defined by the cross-sectional area of the particle. In various embodiments, the particle imaging circuitry 206 may be configured to determine the particle size of particles with any of a variety of particle sizes. As an example, the particle imaging circuitry 206 may be configured to determine particle sizes of particles having a diameter of between about 0.3 and about 100 microns (e.g., 2.5 microns), and thus, a size category with which the particle may be associated, such as, for example, PM10, PM4, PM2.5, or PM1. In various embodiments, the controller and/or the particle imaging circuitry 206 may be further configured to analyze one or more images captured by the imaging device 110 of the fluid composition sensor 100 to determine the shape of each of the one or more particles of the plurality of particles 120 within the collection media 106. In various embodiments, a particle shape may be defined at least in part by a particle cross-sectional area. The particle imaging circuitry 206 may be further configured to determine the particle impaction depth 121 of each of the one or more particles of the plurality of particles 120 within the collection media 106 using one or more image focusing techniques. The particle imaging circuitry 206 may be configured to execute instructions stored, for example, in the memory 201 for carrying out the one or more image focusing techniques. In various embodiments, the one or more image focusing techniques may comprise one or computational techniques, such as, for example, Angular Spectrum Propagation (ASP). In other embodiments, opto-mechanical adjustment may be used as an image focusing technique. In various embodiments, the particle imaging circuitry 206 may use the one or more image focusing techniques to determine a depth of focus 122 for each of the one or more particles of the plurality of particles 120 within the collection media. Upon determining a depth of focus for each of the one or more particles, the particle imaging circuitry 206 may be configured to calculate, using known dimensions of the fluid composition sensor 100 such as, for example, the collection media thickness and the distance between the transparent substrate 108 and the imaging device 110, the impaction depth 121 of each of the one or more particles of the plurality of particles 120 within the collection media 106. In various embodiments, for example, the impaction depth 121 of a particle within the collection media 106 may be calculated by subtracting the measured depth of focus 122 of a particle from the sum of the collection media thickness, the transparent substrate thickness, and the distance between the transparent substrate 108 and the imaging device 110. The particle imaging circuitry 206 may send and/or receive data from the imaging device data repository 107. In various embodiments, the particle imaging circuitry 206 may be configured to determine an impaction depth of a particle using one or more machine learning techniques. In various embodiments, the one or more machine learning techniques used by the particle imaging circuitry 206 to determine the impaction depth of a particle may comprise using deep supervised learning with one or more labeled datasets of one or more known particle characteristics, such as, for example, particle type, particle velocity, particle size, particle shape, and/or any other data generated, transmitted, and/or received by the controller 200 to estimate the impaction depth of the particle.

In various embodiments, the processor 202 may be configured to communicate with the particle type identification circuitry 207. The particle type identification circuitry 207 may be a device or circuitry embodied in either hardware or a combination of hardware and software that is configured to identify a particle type and/or particle species of one or more particles of the plurality of particles 120 received by the collection media 106. In various embodiments, a plurality of particles 120 within a volume of fluid may comprise one or more particles of various particle types, such as, for example, one or more of bacteria, pollen, spores, molds, biological particles, soot, inorganic particles, and organic particles. In various embodiments, the particle type identification circuitry 207 may determine the particle type and/or particle species of each of the one or more particles of the plurality of particles 120 received by the collection media 106 using one or more machine learning techniques. In various embodiments, the one or more machine learning techniques used by the particle type identification circuitry 207 to determine the particle type and/or species of each of the one or more particles of the plurality of particles 120 may comprise analyzing an image captured by the imaging device 110, particle size data, particle shape data, and/or any other data generated, transmitted, and/or received by the controller 200. In various embodiments, the particle type identification circuitry 207 may send and/or receive data from the imaging device data repository 107. Further, in various embodiments, the particle type identification circuitry 207 may be configured to receive the determined particle initial velocity data corresponding to one or more of the particles of the plurality of particles 120 received by the collection media 106 from the particle matter mass concentration calculation circuitry 208. In various embodiments, the particle type identification circuitry 207 may be configured to compare the determined particle initial velocity for a particle to the particle velocity approximated based at least in part on a known flow rate of fluid moving through the fluid composition sensor 100 and generate velocity comparison data associated with the particle. In various embodiments, the particle type identification circuitry 207 may be configured execute a feedback loop, wherein one or more velocity comparison data associated with one or more particles of the plurality of particles 120 received by the collection media 106 may define one or more inputs into a machine learning model in order to increase a rate of machine learning associated with the one or more machine learning techniques, as described herein.

In various embodiments, the device 10 may be configured with, or in communication with, a collection media characteristic database 204. The collection media characteristic database 204 may be stored, at least partially on the memory 201 of the system. In some embodiments, the collection media characteristic database 204 may be remote from, but in connection with, the device 10. The collection media characteristic database 204 may contain information, such as one or more particle impaction depth-momentum relationship look-up tables. In various embodiments, a particle impaction depth-momentum relationship look-up table may comprise a data matrix used to define a relationship between a particle impaction depth and a particle initial momentum (i.e. the momentum of a particle at a receiving surface 105 of the collection media 106, wherein the particle is received by the collection media 106 at the receiving surface 105, as described herein) for a particular collection media type. Various particle impaction depth-momentum relationship look-up tables may comprise data matrices used to define a relationship between a particle impaction depth and a particle initial momentum for various collection media types.

The particle matter mass concentration calculation circuitry 208 may be a device or circuitry embodied in either hardware or a combination of hardware and software that is configured to determine a particulate matter mass concentration within a volume of fluid. In various embodiments, the particle matter mass concentration calculation circuitry 208 may be configured to determine the particulate matter mass concentration within a volume of fluid based on an approximated collective mass of a plurality of particles present within the volume of fluid. In various embodiments, the particle matter mass concentration calculation circuitry 208 may be configured to determine the approximated collective mass of a plurality of particles present within the volume of fluid based on a collective mass of the plurality of particles 120 received by the collection media 106. In various embodiments, the particle matter mass concentration calculation circuitry 208 may be configured to determine a collective mass of the plurality of particles 120 received by the collection media 106 based on the respective estimated masses of each of the particles of the plurality of particles 120. In various embodiments, the particle matter mass concentration calculation circuitry 208 may be configured to estimate the respective masses of each of the particles of the plurality of particles 120 based at least in part on the respective determined impaction depths of each particle.

In various embodiments, the particle matter mass concentration calculation circuitry 208 may be configured to estimate the mass of a particle of the plurality of particles 120 by retrieving data corresponding to a particle such as, for example, particle size data, particle shape data (e.g., particle cross-sectional area data, particle orientation data), and particle impaction depth, and, based on data in a particle impaction depth-momentum look-up table that correlates particle impaction depth to particle initial momentum for a given collection media 106 type, determine the initial momentum of the particle prior to the particle being received by the collection media 106. Using a known relationship between momentum, velocity, and mass—the momentum of a particle is equal to the mass of the particle multiplied by the velocity of the particle—and the known velocity of the particle—a controlled value based on an air flow velocity within the device 10—the particle matter mass concentration calculation circuitry 208 may be configured to determine the estimated mass of the particle.

In various embodiments, the particle matter mass concentration calculation circuitry 208 may be configured to determine the estimated mass of the particle using one or more machine learning techniques. In various embodiments, the one or more machine learning techniques used by the particle matter mass concentration calculation circuitry 208 to determine the particle mass of a particle may comprise using deep supervised learning with one or more labeled datasets of one or more known particle characteristics, such as, for example, particle type, particle velocity, particle impaction depth, various particle gravimetric measurements, and/or any other data generated, transmitted, and/or received by the controller 200 to estimate the mass of the particle. In various embodiments, the particle matter mass concentration calculation circuitry 208 may be configured to apply one or more compensation factors to a determined particle mass using one or more machine learning techniques.

Further, in various embodiments, the particle matter mass concentration calculation circuitry 208 may be configured to determine the estimated density of the particle based at least in part on one or more of the particle impaction depth, the estimated particle mass, the particle shape, the particle type, and the particle size data. In various embodiments, the particle matter mass concentration calculation circuitry 208 may be configured to determine the estimated mass and/or density of each of the particles of the plurality of particles 120 received by the collection media 106. In various embodiments, the particle matter mass concentration calculation circuitry 208 may be configured to apply one or more compensation factors to the estimated mass of the particle to account for one or both of a particle condition associated with the particle and ambient conditions associated with the ambient environment. In various embodiments, for example, the particle matter mass concentration calculation circuitry 208 may be configured to apply an appropriate compensation factor based at least in part on the particle cross-sectional area, the ambient temperature, and/or the ambient humidity. In various embodiments, the particle matter mass concentration calculation circuitry 208 may be configured to determine the estimated collective mass of the plurality of particles 120 received by the collection media based on the estimated mass of each of the particles of the plurality of particles 120 received by the collection media 106. In various embodiments, the particle matter mass concentration calculation circuitry 208 may be configured to determine the approximate collective mass of a plurality of particles present within the volume of fluid based on a determined collective mass of the plurality of particles 120 received by the collection media 106. In various embodiments, the particle matter mass concentration calculation circuitry 208 may be configured to determine the particulate matter mass concentration within the volume of fluid based on the approximate collective mass of the plurality of particles present within the volume of fluid. In various embodiments, the particle matter mass concentration calculation circuitry 208 may be configured to apply one or more scale factors to the determined particulate matter mass concentration within the volume of fluid to account for experimental inefficiencies such as, for example, particle collection efficiencies and detection probability factors. In various embodiments, an appropriate scale factor may be determined based on empirical data.

Moreover, the particle matter mass concentration calculation circuitry 208 may be configured to determine that the collection media 106 needs to be replaced. For example, in various embodiments, the particle matter mass concentration calculation circuitry 208 may be configured to determine that a threshold amount of time has passed since the collection media 106 was last replaced, that the number of particles present within the collection media 106 has surpassed a predetermined threshold number of particles, and/or that a percentage of particle coverage within a field of view has surpassed threshold particle coverage percentage.

Further, in various embodiments, the particle matter mass concentration calculation circuitry 208 may be configured to determine a particle initial velocity for one or more particles of the plurality of particles 120 received by the collection media 106 based at least in part the determined particle mass of the particle, wherein the particle initial velocity is a velocity of the particle at the receiving surface 105 of the collection media 106. In various embodiments, the particle matter mass concentration calculation circuitry 208 may be configured to transmit the determined particle initial velocity data corresponding to one or more of the particles of the plurality of particles 120 received by the collection media 106 to the particle type identification circuitry 207.

In various embodiments, the device 10 may be configured with, or in communication with, an imaging device data repository 107. The imaging device data repository 107 may be stored, at least partially on the memory 201 of the system. In some embodiments, the imaging device data repository 107 may be remote from, but in connection with, the device 10. The imaging device data repository 107 may contain information, such as images relating to one or more potential components of fluids. In some embodiments, the imaging device data repository 107, and/or other similar reference databases in communication with the device 10, may comprise non-image information used to identify particles (e.g., for florescent particles, a spectrometer may be used by the fluid composition sensor 100 as discussed herein and the device 10 may receive spectrum information to identify and/or classify the particles). In some embodiments, the device 10 may also use machine learning for identifying and/or classifying particles, such that the device 10 may use a reference database, such as the imaging device data repository 107, to initially train the device 10 and then may be configured to identify and/or classify particles without referencing the imaging device data repository 107 or other reference databases (e.g., a system may not be in active communication with the imaging device data repository 107 during regular operations).

Method

Figure 4:
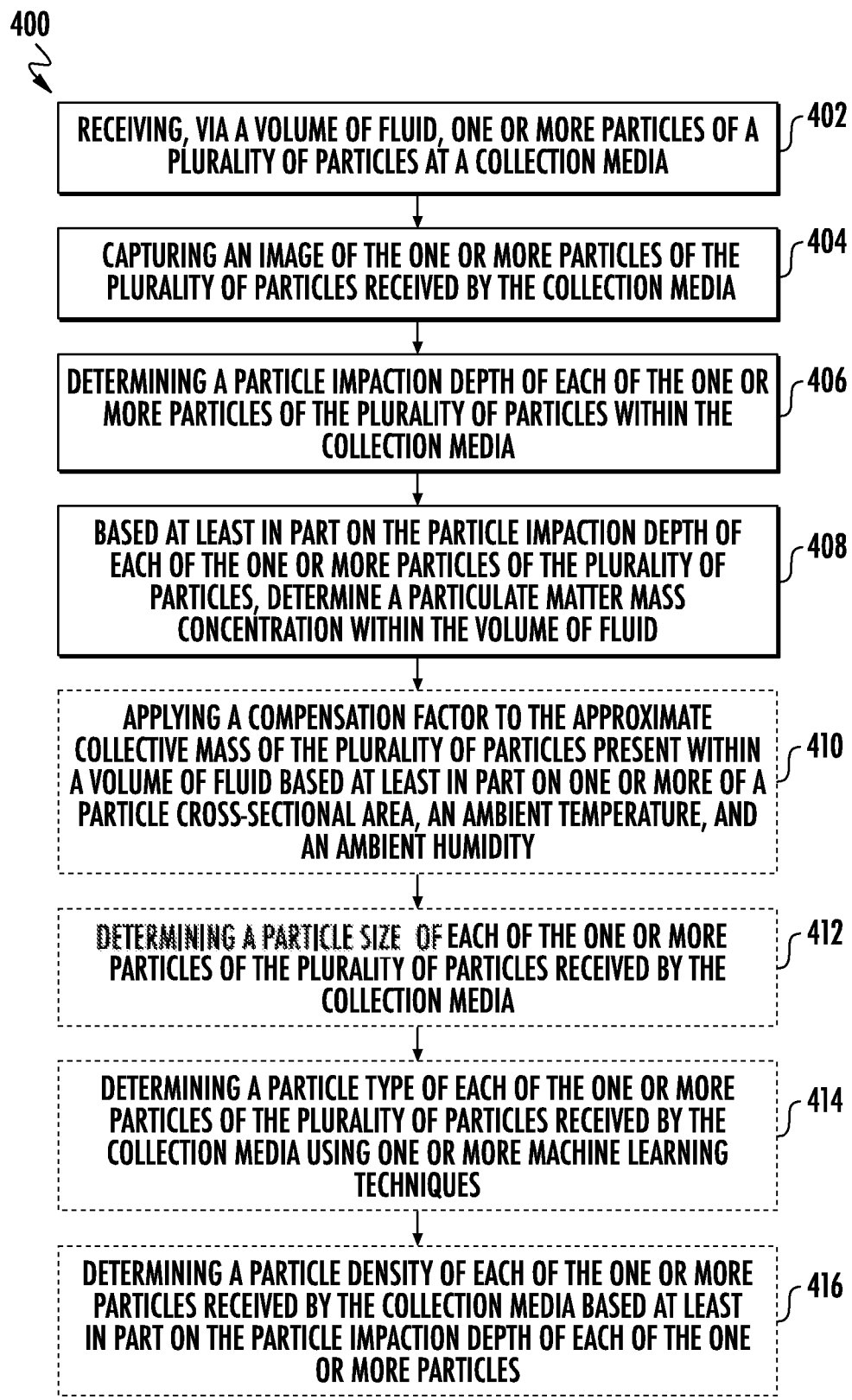
FIG. 4 illustrates a flow diagram of an exemplary method for detecting fluid particle characteristics of a fluid according to embodiments of the present disclosure.

FIG. 4 illustrates a block diagram of an exemplary method 400 for detecting fluid particle characteristics in accordance with some embodiments discussed herein.

At block 402, one or more particles of a plurality of particles may be received by a collection media via a volume of fluid. The plurality of particles may be received by the collection media from a volume of fluid comprising a plurality of particles. In various embodiments, the plurality of particles received by the collection media may be representative of a plurality of particles present within a volume of fluid. In various embodiments, a fluid composition sensor may comprise the collection media and may be configured so as to direct at least a portion of the volume of fluid in a direction perpendicular to a receiving surface of the collection media such that the volume of fluid may interact with the collection media.

Further, at block 404, an image is captured of the one or more particles of the plurality of particles received by the collection media. In various embodiments, the image of the one or more particles of the plurality of particles received by the collection media may be captured by an imaging device. In various embodiments, the imaging device may be configured to capture both an image of the one or more particles of the plurality of particles present within the collection media at the beginning of a particle analysis and an image of the one or more particles of the plurality of particles present within the collection media at the end of a particle analysis. The images may be compared to determine which of the one or more particles of the plurality of particles present within the collection media were received by the collection media during the particle analysis. In various embodiments, the imaging device may be disposed within a fluid composition sensor proximate the collection media such that the one or more particles of the plurality of particles received by the collection media are within a designated field of view of the imaging device. In various embodiments, the image of one or more particles of the plurality of particles received by the collection media may be captured using one or more imaging techniques, such as, for example lensless holography or optical microscopy. In various embodiments, the particle image may comprise a holographic image reconstruction.

At block 406, a particle impaction depth of each of the one or more particles of the plurality of particles within the collection media is determined. The particle impaction depth of a particle received by a collection media may be defined by the depth at which the particle is embedded into the collection media. In various embodiments, the particle impaction depth of each of the one or more particles of the plurality of particles within the collection media may be determined using an image captured by an imaging device. In various embodiments, the particle impaction depth of each of the one or more particles of the plurality of particles within the collection media may be determined based on a measured depth of focus, a distance between the imaging device and the transparent substrate, a thickness of the transparent substrate, and a collection media thickness, wherein the depth of focus is the distance between the imaging device and the particle. The depth of focus of a particle may be defined as the distance between an imaging device and the particle. In various embodiments, the depth of focus of each of the one or more particles of the plurality of particles received by the collection media may be determined using one or more image focusing techniques, such as a computational technique (e.g., Angular Spectrum Propagation) and/or a mechanical technique (e.g., opto-mechanical adjustment). In various embodiments, the impaction depth of each of the one or more particles of the plurality of particles within the collection media may be calculated by subtracting the measured depth of focus of each particle from the sum of the collection media thickness, a transparent substrate thickness, and a distance between the transparent substrate and the imaging device.

At block 408, an approximate collective mass of the plurality of particles present within a volume of fluid is determined based at least in part on the particle impaction depth of each of the one or more particles of the plurality of particles. In various embodiments, the respective determined particle impaction depths of each particle may be used to estimate the respective masses of each of the particles of the plurality of particles. In various embodiments, based on data in a particle impaction depth-momentum look-up table that correlates particle impaction depth to particle initial momentum for a given collection media type, the particle impaction depth and the measured particle size data may be used to determine the initial momentum of each particle prior to the particle being received by the collection media. Using a known relationship between momentum, velocity, and mass—the momentum of a particle is equal to the mass of the particle multiplied by the velocity of the particle—and a known velocity of each particle—a controlled value based on an air flow velocity of the volume of fluid—the estimated mass of each of the particles may be determined. In various embodiments, one or more compensation factors may be applied to the estimated mass of each of the particles to account for one or both of a particle condition associated with the particle and ambient conditions associated with an ambient environment. In various embodiments, for example, an appropriate compensation factor may be applied based at least in part on a particle cross-sectional area, an ambient temperature, and/or an ambient humidity. In various embodiments, the respective estimated masses of each of the particles of the plurality of particles may be used to determine the collective mass of the plurality of particles received by the collection media. In various embodiments, the determined collective mass of the plurality of particles received by the collection media may be used to approximate a collective mass of a plurality of particles present within the volume of fluid. In various embodiments, the approximated collective mass of a plurality of particles present within the volume of fluid may be used to estimate a particulate matter mass concentration within the volume of fluid. In various embodiments, one or more scale factors may be applied to the determined particulate matter mass concentration within the volume of fluid to account for experimental inefficiencies such as, for example, particle collection efficiencies and detection probability factors. In various embodiments, an appropriate scale factor may be determined based on empirical data.

At block 410, a compensation factor may be applied to the approximate collective mass of the plurality of particles present within a volume of fluid based at least in part on one or more of a particle cross-sectional area, an ambient temperature, and an ambient humidity. In various embodiments, a compensation factor may be applied to the estimated mass of each of the particles to account for one or both of a particle condition associated with the particle and ambient conditions associated with an ambient environment. In various embodiments, for example, a compensation factor may be applied to the estimated mass of a particle to account for the particle cross-sectional area because a larger particle cross-sectional area will disperse kinetic energy more quickly within the collection media, thereby decreasing the particle impaction depth. In various embodiments, a compensation factor may be applied to the estimated mass of a particle to account for the ambient temperature and/or ambient humidity because both the ambient temperature and ambient humidity affect the viscosity of the collection media, and therefore, the particle impaction depth. In various embodiments, the ambient temperature and humidity may be measured by either the device or one or more remote sensors configured to transmit temperature and humidity data to the device.

At block 412, the particle size of each of the one or more particles of the plurality of particles received by the collection media may be determined. In various embodiments, the particle size of each of the one or more particles may be determined based on the captured particle image. In various embodiments, the particle size of particles with a diameter of between about 0.3 and about 100 microns (e.g., 2.5 microns) may be determined, and a size category such as, for example, PM10, PM4, PM2.5, or PM1. In various embodiments, particle size data may comprise particle cross-sectional area data.

At block 414, a particle type of each of the one or more particles of the plurality of particles received by the collection media may be determined using one or more machine leaning techniques. In various embodiments, the one or more machine learning techniques used to determine the particle type of each of the one or more particles of the plurality of particles may comprise analyzing a captured particle image of the one or more particles, particle size data, and/or any other data associated with the one or more particles. In some embodiments, machine learning techniques may be used for identifying and/or classifying particles. In various embodiments, a reference imaging database comprising various particle data may be used to initially train a machine learning apparatus, which may then be then may be utilized to identify and/or classify particles without referencing the imaging database or other reference databases.

At block 416, a particle density of each of the one or more particles of the plurality of particles received by the collection media may be determined based at least in part on the particle impaction depth of each of the one or more particles. In various embodiments, the particle density of a particle may be determined based at least in part on one or more of the particle impaction depth, the estimated particle mass, the particle type, and the particle size data.

In various embodiments, the method described herein may further comprise replacing the collection media as described herein. In various embodiments, the collection media may be replaced based on one or more parameters such as, for example, time elapsed, number of particles received, and/or percentage of particle coverage within a field of view.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device for detecting fluid particle characteristics comprising:
   a fluid composition sensor configured to receive a volume of fluid, the fluid composition sensor comprising:
      a collection media configured to receive one or more particles of a plurality of particles;
      an imaging device configured to capture an image of one or more particles of the plurality of particles received by the collection media; and
   a controller configured to:
      determine a particle impaction depth of at least one of the one or more particles of the plurality of particles within the collection media; and
      based at least in part on the particle impaction depth of each of the one or more particles of the plurality of particles, determine a particulate matter mass concentration within the volume of fluid.

2. The device of claim 1, wherein the image captured by the fluid composition sensor comprises two or more particle images of the one or more particles of the plurality of particles received by the collection media.

3. The device of claim 2, wherein a particle image comprises a holographic image reconstruction of a particle.

4. The device of claim 1, wherein the imaging device is configured to capture the image of one or more particles of the plurality of particles received by the collection media using lensless holography.

5. The device of claim 1, wherein the imaging device is configured to capture the image of one or more particles of the plurality of particles received by the collection media using optical microscopy.

6. The device of claim 1, wherein the controller is configured to determine a particle impaction depth of each of the one or more particles of the plurality of particles within the collection media using one or more computational image focusing techniques.

7. The device of claim 6, wherein the one or more computational image focusing techniques comprise Angular Spectrum Propagation.

8. The device of claim 1, wherein the controller is configured to determine a particle impaction depth of each of the one or more particles of the plurality of particles within the collection media using one or more mechanical image focusing techniques.

9. The device of claim 1, wherein the controller determines the particle impaction depth of a particle received by the collection media based on a depth of focus determined using one or more image focusing techniques, a distance between the imaging device and the transparent substrate, and a collection media thickness, wherein the depth of focus is the distance between the imaging device and the particle.

10. The device of claim 1, wherein the controller is further configured to determine the approximate collective mass of the plurality of particles present within the volume of fluid based at least in part on the mass of each of the one or more particles received by the collection media.

11. The device of claim 10, wherein the controller is further configured to determine the mass of each of the one or more particles received by the collection media based at least in part on an initial momentum of each of the one or more particles, a collection media type, and the particle impaction depth of each of the one or more particles.

12. The device of claim 11, wherein the controller is further configured to determine the initial momentum of each of the one or more particles received by the collection media based at least in part on the particle impaction depth and a particle initial velocity of each of the one or more particles.

13. The device of claim 1, wherein the controller is further configured to apply a compensation factor to the approximate collective mass of the plurality of particles present within the volume of fluid based at least in part on one or more of a particle cross-sectional area, an ambient temperature, and an ambient humidity.

14. The device of claim 1, wherein the controller is further configured to determine a particle type of each of the one or more particles received by the collection media using one or more machine learning techniques.

15. The device of claim 14, wherein the controller is further configured to determine a particle density of each of the one or more particles received by the collection media based at least in part on the particle impaction depth of each of the one or more particles.

16. The device of claim 1, wherein the collection media is embodied as a portion of a removable collection media slide configured for movement relative to the fluid composition sensor.

17. A method for detecting fluid particle characteristics comprising:
receiving, via a collection media, one or more particles of a plurality of particles;
capturing an image of the one or more particles of the plurality of particles received by the collection media;
determining a particle impaction depth of at least one of the one or more particles of the plurality of particles within the collection media; and
based at least in part on the particle impaction depth of each of the one or more particles of the plurality of particles, determine an approximate collective mass of the plurality of particles present within a volume of fluid.

18. The method of claim 17, wherein the image of the one or more particles of the plurality of particles received by the collection media is captured using lensless holography.

19. The method of claim 17, wherein the image of the one or more particles of the plurality of particles received by the collection media is captured using optical microscopy.

20. The method of claim 17, wherein the particle impaction depth of each of the one or more particles of the plurality of particles within the collection media is determined using one or more computational image focusing techniques.

21. The method of claim 20, wherein the one or more computational image focusing techniques comprise Angular Spectrum Propagation.

22. The method of claim 17, wherein the particle impaction depth of each of the one or more particles of the plurality of particles within the collection media is determined using one or more mechanical image focusing techniques.

23. The method of claim 17, wherein the particle impaction depth of each of the one or more particles of the plurality of particles within the collection media is determined based at least in part on a depth of focus, a distance between the imaging device and the transparent substrate, a thickness of the transparent substrate, and a collection media thickness, wherein the depth of focus is the distance between the imaging device and the particle.

24. The method of claim 17, further comprising determining the particle size each of the one or more particles of the plurality of particles received by the collection media.

25. The method of claim 24, wherein the mass of each of the one or more particles received by the collection media is determined based at least in part on an initial momentum of each of the one or more particles, a collection media type, and the particle impaction depth of each of the one or more particles.

26. The method of claim 25, wherein the initial momentum of each of the one or more particles received by the collection media is determined based at least in part on the particle impaction depth and a particle initial velocity of each of the one or more particles.

27. The method of claim 17, further comprising applying a compensation factor to the approximate collective mass of the plurality of particles present within a volume of fluid based at least in part on one or more of a particle cross-sectional area, an ambient temperature, and an ambient humidity.

28. The method of claim 17, further comprising determining a particle type of each of the one or more particles received by the collection media using one or more machine learning techniques.

29. The method of claim 17, further comprising determining a particle density of each of the one or more particles received by the collection media based at least in part on the particle impaction depth of each of the one or more particles.

* * * * *